United States Patent
O'Reilly et al.

(10) Patent No.: US 7,809,738 B2
(45) Date of Patent: Oct. 5, 2010

(54) SYSTEM FOR DETERMINING CHANGES IN THE RELATIVE INTEREST OF SUBJECTS

(75) Inventors: Daniel F. X. O'Reilly, Bedford, MA (US); John L. Moss, Wayland, MA (US); Pasco Gasbarro, Somerville, MA (US)

(73) Assignee: West Services, Inc., Eagan, MN (US)

( * ) Notice: Subject to any disclaimer, the term of this patent is extended or adjusted under 35 U.S.C. 154(b) by 899 days.

(21) Appl. No.: 11/016,075

(22) Filed: Dec. 17, 2004

(65) Prior Publication Data

US 2005/0102267 A1    May 12, 2005

Related U.S. Application Data

(63) Continuation of application No. 09/619,104, filed on Jul. 19, 2000, now Pat. No. 6,853,950.

(60) Provisional application No. 60/144,688, filed on Jul. 20, 1999.

(51) Int. Cl.
    G06F 17/30    (2006.01)
(52) U.S. Cl. .................................................. 707/758
(58) Field of Classification Search ............. 707/104.1, 707/200, 705, 758, 999.001, 949, 999.2
    See application file for complete search history.

(56) References Cited

U.S. PATENT DOCUMENTS

| | | | |
|---|---|---|---|
| 5,488,725 A * | 1/1996 | Turtle et al. ................... 707/5 |
| 5,495,430 A | 2/1996 | Matsunari et al. |
| 5,496,071 A | 3/1996 | Walsh |
| 5,576,954 A * | 11/1996 | Driscoll ........................ 707/3 |
| 5,675,510 A | 10/1997 | Coffey et al. |
| 5,721,910 A * | 2/1998 | Unger et al. .................. 707/100 |
| 5,740,549 A | 4/1998 | Reilly et al. |
| 5,754,939 A | 5/1998 | Herz et al. |
| 5,761,662 A | 6/1998 | Dasan |
| 5,784,608 A | 7/1998 | Meske, Jr. et al. |
| 5,797,001 A | 8/1998 | Augenbraun et al. |
| 5,799,304 A | 8/1998 | Miller |
| 5,832,470 A * | 11/1998 | Morita et al. .................. 707/1 |
| 5,857,181 A | 1/1999 | Augenbraun et al. |
| 5,893,082 A | 4/1999 | McCormick |
| 5,953,732 A | 9/1999 | Meske, Jr. et al. |
| 5,978,807 A | 11/1999 | Mano et al. |
| 5,991,735 A | 11/1999 | Gerace |

(Continued)

OTHER PUBLICATIONS

"U.S. Appl. No. 09/619,104, Final Office Action mailed Jan. 15, 2004", 10 p.

(Continued)

*Primary Examiner*—John E Breene
*Assistant Examiner*—Thu-Nguyet Le
(74) *Attorney, Agent, or Firm*—Edwards Angell Palmer & Dodge LLP; Barry Kramer; David J. Silvia

(57) ABSTRACT

A system for determining changes in the interest of a subject over a time period. The system measures the volume of news articles for a subject over a time period and makes a comparison to a previous volume of news articles for the same subject over a previous time period.

25 Claims, 2 Drawing Sheets

U.S. PATENT DOCUMENTS

| | | | |
|---|---|---|---|
| 6,009,409 | A | 12/1999 | Adler et al. |
| 6,047,327 | A | 4/2000 | Tso et al. |
| 6,076,088 | A | 6/2000 | Paik et al. |
| 6,144,963 | A * | 11/2000 | Tsuda .................. 707/10 |
| 6,279,013 | B1 | 8/2001 | LaMarca et al. |
| 6,292,796 | B1 | 9/2001 | Drucker et al. |
| 6,295,092 | B1 | 9/2001 | Hullinger et al. |
| 6,377,963 | B1 | 4/2002 | Walker et al. |
| 6,449,616 | B1 | 9/2002 | Walker et al. |
| 6,578,025 | B1 | 6/2003 | Pollack et al. |
| 6,598,045 | B2 | 7/2003 | Light et al. |
| 6,853,950 | B1 * | 2/2005 | O'Reilly et al. ............. 702/179 |
| 2002/0049727 | A1 | 4/2002 | Rothkopf |
| 2002/0169762 | A1 | 11/2002 | Cardona |

OTHER PUBLICATIONS

"U.S. Appl. No. 09/619,104, Final Office Action mailed Sep. 24, 2002", 9 p.

"U.S. Appl. No. 09/619,104, Non-Final Office Action mailed Apr. 1, 2002", 8 p.

"U.S. Appl. No. 09/619,104, Non-Final Office Action mailed May 20, 2003", 9 p.

"U.S. Appl. No. 09/619,104, Notice of Allowance mailed Aug. 16, 2004", 6 p.

"U.S. Appl. No. 09/619,104, Response filed Mar. 24, 2003 to Non-Final Office Action mailed Sep. 24, 2002", 8 p.

"U.S. Appl. No. 09/619,104, Response filed Jul. 14, 2004 to Final Office Action mailed Jan. 15, 2004", 14 p.

"U.S. Appl. No. 09/619,104, Response filed Sep. 3, 2002 to Non-Final Office Action mailed Apr. 1, 2002", 4 p.

"U.S. Appl. No. 09/619,104, Response filed Nov. 20, 2003 to Non-Final Office Action mailed May 20, 2003", 13 p.

* cited by examiner

SYSTEM FOR DETERMINING CHANGES IN THE RELATIVE INTEREST OF SUBJECTS

REFERENCE TO PENDING PRIOR PATENT APPLICATIONS

This is a continuation of prior U.S. patent application Ser. No. 09/619,104, filed Jul. 19, 2000 by Daniel F.X. O'Reilly et al. for SYSTEM FOR DETERMINING CHANGES IN THE RELATIVE INTEREST OF SUBJECTS, now U.S. Pat. No. 6,853,950, which in turn claims benefit of prior U.S. Provisional Patent Application Ser. No. 60/144,688, filed Jul. 20, 1999 by Daniel F.X. O'Reilly et al. for APPARATUS AND METHOD FOR TRACKING NEWS TOPICS. The above-identified patent applications and patent are hereby incorporated by reference.

FIELD OF THE INVENTION

This invention relates generally to data analysis systems and, more particularly, to data analysis systems for tracking the volume, and changes in the volume, of news articles related to particular subjects.

BACKGROUND OF THE INVENTION

In the past, tracking changes in the volume of news articles regarding particular subjects required a significant investment of time by an analyst. The analyst would research publications related to the particular subject, such as a company or companies, and make a subjective assessment as to the importance of the articles discovered. However, manual tracking of information related to a subject is rather imprecise and time consuming. Any results obtained are contingent on the expertise of the individual analyst and may vary significantly over a period of time.

OBJECTS OF THE INVENTION

One object of the invention is to measure, compare, and report the volume of news articles related to a subject and any changes in that volume from a predetermined volume.

Another object of the invention is to provide a signal to alert the user when the change in the volume of news articles for a particular subject is greater than a predetermined amount.

And another object of the invention is to measure the frequency of news articles related to a subject.

Still another object of the invention is to measure the changes in frequency of news articles related to a subject.

Yet another object of the invention is to provide a method for comparing the frequency of news articles.

Another object of the invention is to compare the changes in frequencies of news articles related to multiple subjects.

And another object of the invention is to provide a method for allowing comparison of data collected from a server having different numbers of news sources at different periods of time.

Still another object of the invention is to measure and compare the changes in frequency of news articles related to particular subjects, such as company names, company stock ticker abbreviations, people, products and topics.

SUMMARY OF THE INVENTION

These and other objects are addressed by the present invention, which comprises a system for determining changes in the volume of news articles related to a subject over a time period. The invention includes measuring the volume of news articles for the subject over a recent time period. Next, a comparison is made of the volume of news articles over the recent time period relative to the volume of news articles for a prior time period. When the comparison yields a difference greater than a predetermined amount, a signal is generated to notify users that a significant change has occurred in the volume of news articles related to the subject.

Preferably, the system is configured to measure and compare multiple subjects over a time period. The invention includes measuring the volume of the news articles for each respective subject over the time period. A comparison is made, for each respective subject, of the volume of news articles over the time period relative to the volume of news articles over a prior time period. When the comparison for a particular respective subject yields a difference greater than a predetermined amount, an appropriate signal is generated to notify users of the significant change in volume.

The system may also be configured to measure and compare multiple subjects over multiple time periods. In this configuration, the system measures the volume of news articles for each respective subject over a recent time period. Next, for each subject, comparisons are made of the volume of news articles over the recent time period against a weighted measure of news articles over previous time periods. When the comparison for a particular subject yields a difference in volume greater than a predetermined amount, an appropriate signal is generated notifying users of the significant change.

In another form of the invention, a computer server receives news articles from various news sources, holds the news articles for a set amount of time, and then automatically purges articles based on the age and relevance of each article.

In another form of the invention, a tagging mechanism is provided to analyze and code each article. More particularly, the tagging mechanism codes a particular article for the names of one or more companies, stock ticker symbols, names of people, and other topics of interest.

In accordance with another aspect of the invention, a server reconfiguration factor is determined to compensate for the addition or deletion of news sources from the server configuration. This reconfiguration factor is retrospectively applied to stored data, so as to permit accurate comparison between data derived from the present news source configuration and data derived from previous news source configurations.

In another embodiment of the invention, the frequency of news articles for a subject is calculated based on the volume of news articles for that subject over a selected time period. The frequency of news articles published for each subject may be substituted for the volume of news articles in the comparisons discussed above. When the frequencies for a particular subject are cyclical or display a seasonality, this may be factored into the data analysis.

In accordance with another aspect of the invention, a weighted average of the measured volume, or frequency, of the news articles relating to the recent, and previous, time periods may be used for the comparison.

Still other objects, features and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE PREFERRED EMBODIMENTS

Figure 1:
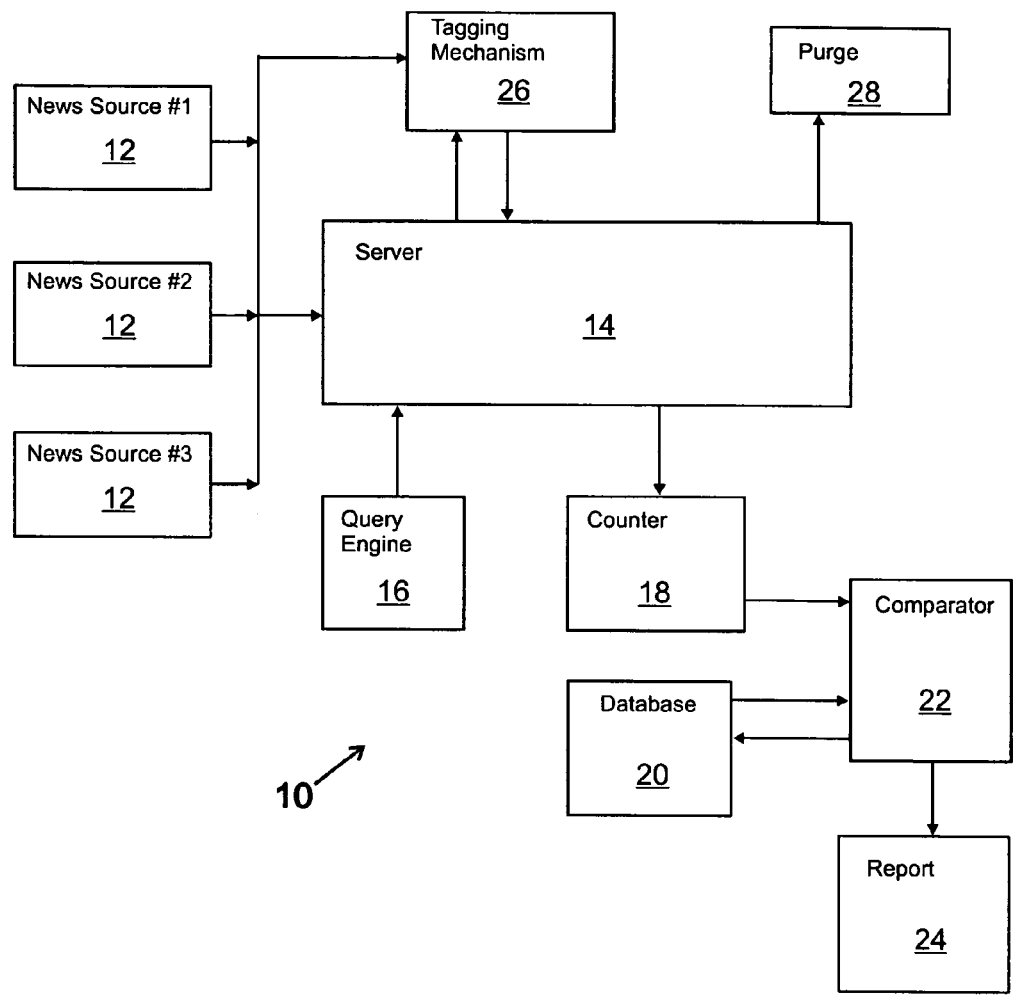
FIG. 1 is a schematic drawing of a representative embodiment of the system of the present invention.

Referring first to FIG. 1, a system 10 is disclosed for determining changes in interest of one or more subjects over single and multiple time periods. In order to facilitate a better understanding of the present invention, several preferred embodiments are discussed below. One embodiment tracks one subject over one time period. Another embodiment tracks multiple subjects over one time period. A third embodiment tracks multiple subjects over multiple time periods.

One Subject, One Time Period

Still referring to FIG. 1, in the simplest case, the system 10 can be configured for determining changes in the interest of a selected subject over a recent time period. In this first embodiment, system 10 receives news articles from one or more news sources 12 and stores the news articles in a computer server 14.

Server 14, or other computer processors in communication with server 14, perform the following functions.

A query engine 16 is in communication with server 14 and is programmed to generate queries related to the selected subject over the recent time period. Each query polls the news server 14 to determine which news articles relate to the selected subject over the recent time period.

A counter 18 is in communication with server 14 and receives data generated in response to the queries from query engine 16. Counter 18 generates a count of the news articles relating to the selected subject over the recent time period.

A database 20 is in communication with counter 18 and stores information. Database 20 stores (1) the count of news articles relating to the selected subject over the recent time period, and (2) the previous count(s) of news articles relating to the selected subject over at least one other previous time period.

A comparator 22 is in communication with counter 18 and with database 20. Comparator 22 receives the count of news articles over the recent time period from counter 18, and the previous count(s) of news articles over at least one other previous time period from database 20. Comparator 22 evaluates the relationship between the counts of news articles for the selected subject over the recent time period and over the at least one previous time period.

When the count for the recent time period differs from the count for the at least one previous time period by a predetermined amount, a report 24 is generated. The report 24 may include a signal to identify that the selected subject has had a significant increase in the number of news articles about that subject. Alternatively, the report 24 may include textual, graphical or other output identifying the subject, the count of news articles over the recent time period, the duration of the recent time period, the count(s) of news articles over the at least one previous time period, and the duration of previous time period(s).

Multiple Subjects, One Time Period

The system 10 shown in FIG. 1 can also be configured to determine changes in the interest in multiple selected subjects over a recent time period. Again, system 10 receives news articles from one or more news sources 12 and stores the news articles in computer server 14.

Server 14, or other computer processors in communication with server 14, perform the following functions.

Query engine 16 is in communication with server 14 and is programmed to generate queries related to each of the selected subjects over the recent time period. Each query polls news server 14 to determine which news articles relate to each of the selected subjects over the recent time period.

Counter 18 is in communication with server 14 and receives data generated in response to queries from query engine 16. Counter 18 generates, for each of the selected subjects, a count of the news articles over the recent time period.

Database 20 is in communication with counter 18 and stores information. Database 20 stores, for each selected subject, (1) the count of the news articles relating to the selected subject over the recent time period, and (2) the previous count(s) of news articles relating to the selected subject over at least one previous time period.

Comparator 22 is in communication with counter 18 and database 22. Comparator 22, for each of the selected subjects, receives the count of news articles over the recent time period from counter 18, and receives the previous count(s) of news articles over at least one other previous time period from database 20. Comparator 22 evaluates, for each selected subject, the relationship between the counts of news articles over the recent time period and over the at least one previous time period.

A report 24 is generated, for each of the selected subjects, when the count for the recent time period differs from the count for the at least one previous time period by a predetermined amount. Report 24 may include a signal to identify that the selected subject has had a significant increase in the number of news articles about that subject. Alternatively, report 24 may include, for each subject, textual, graphical, or other output identifying the subject, the count of news articles over the recent time period, the duration of the recent time period, the count(s) of the news articles over the at least one previous time period, and the duration of the previous time period(s). Alternatively, the relative magnitudes of changes in news volume across all subjects can be sorted and a report identifying the subjects with the most significant change in news volume can be generated.

Multiple Subjects, Multiple Time Periods

The system 10 shown in FIG. 1 can also be configured to determine changes in the interest in multiple selected subjects over multiple recent time periods. Again, system 10 receives news articles from one or more news sources 12 and stores the news articles in computer server 14.

The server 14, or other computer processors in communication with server 14, perform the following functions.

Query engine 16 is in communication with server 14 and is programmed to generate queries related to each of the selected subjects over each of the recent time periods. Each query polls news server 14 to determine which news articles relate to each of the selected subjects over each of the recent time periods.

Counter 18 is in communication with server 14 and receives data generated in response to queries from query engine 16. Counter 18 generates, for each of the selected subjects, a count of the news articles over each of the recent time periods.

Database 20 is in communication with counter 18 and stores information. Database 20 stores, for each of the selected subjects, (1) the count of the news articles relating to the selected subject, over each of the recent time periods, and (2) the previous count(s) of news articles relating to the selected subjects over at least one previous time period.

Comparator 22 is in communication with counter 18 and database 20. Comparator 22, for each of the selected subjects, receives the count of news articles over each of the recent time periods from counter 18, and receives the previous counts of news articles over corresponding previous time periods from database 20. The comparator 22 evaluates, for each selected subject, the relationship between the count of news articles over each of the recent time periods and between the count of news articles over corresponding previous time periods.

A report 24 is generated for each of the selected subjects, and for each of the recent time periods, when the count of news articles differs from the count for a corresponding previous time period by a predetermined amount. Report 24 may include a signal to identify those time periods in which the subject has had a significant increase in the number of news articles. Alternatively, report 24 may include, for each subject, and for each of the recent time periods, textual, graphical, or other output identifying the subject, the count of news articles over the recent time period, the duration of the recent time period, the count(s) of news articles over the at least one previous time period, and the duration of the previous time periods. Alternatively, the relative magnitudes of changes in news volume across all subjects can be sorted and a report identifying the subjects with the most significant change in news volume can be generated.

Reconfiguration Factor

In as much as it is anticipated that the number of news sources 12 will change over time, a method is provided for determining a news source reconfiguration factor. The reconfiguration factor is a measure of the relative change in the volume of news articles received due to the change in the number of news sources. The reconfiguration factor allows presently measured volumes of news articles to be reliably compared with volumes of news articles measured over other time periods with dissimilar numbers of news sources 12.

System 10 is substantially the same as the system 10 described above, except that it is configured to generate and utilize the reconfiguration factor.

More particularly, query engine 16 is also programmed to generate queries related to the count of news articles for all subjects over a recent time period, i.e., having a different number of news sources than a previous time period.

Counter 18 receives data generated by server 14 in response to queries from query engine 16. Counter 18 generates a count of the news articles for all subjects over the recent time period.

Database 20 stores this count of news articles for all subjects over the recent time period, and stores the reconfiguration factor as calculated below.

Comparator 22 receives, from counter 18, the count of news articles for all subjects over the recent time period, and receives from database 20 the count of news articles for all subjects over the previous time period. Comparator 22 calculates the reconfiguration factor by comparing the count for the recent time period with the count for the previous time period.

Several different methods may be used to calculate the reconfiguration factor.

A simple method for calculating the reconfiguration factor is to divide the count of the recent time period by the count of the previous time period when the periods are of equal duration. Once the reconfiguration factor has been obtained, all previous counts of news articles over the previous time periods stored in database 20 are converted to a new count corresponding to the present news source configuration by multiplying the previous counts by the reconfiguration factor.

In another method for calculating the reconfiguration factor, the logarithmic values are determined for the count, or for the frequency of the count, of news articles for the recent and previous time periods. These logarithmic values are then used in place of the respective count, or frequency, to calculate an additive reconfiguration factor. The logarithmic values are also stored in the database and used to reconfigure data stored in the database.

Weighted Moving Average

In another preferred embodiment of system 10, a weighted moving average is used to compare the volume of news articles for a subject over a recent time period with previous time periods. The weighted moving average provides a means for comparing data over longer periods of time so as to permit greater accuracy in determining changes of volume.

Such a system is substantially the same as the system 10 described above, except that it is configured to generate and utilize the weighted moving average. More particularly, query engine 16 queries server 14 for news articles relating to a subject over several time periods including a most recent time period, one or more previous time periods, and a most previous time period.

Counter 18 receives data relating to the queries and determines the count of news articles for each of the time periods involved.

To compile the weighted average, comparator 22 computes the value of the counts of news articles for the most recent and one or more previous time periods, not including the most previous time period, and the counts of news articles for the one or more previous time periods and the most previous time period, not including the most recent time period. These values are compared to one another to determine if there is a large difference between them, which would signal a significant change in the volume of news articles for a particular subject.

In order to illustrate this concept, the following example shows the weighted moving average for the previous week measured against the week beginning a day earlier in order to determine the value of change for the previous day.

Query engine 16 queries server 14 for news articles relating to a subject over each of the past eight days. Counter 18 receives data relating to the queries and determines the counts of news articles relating to the subject for each of the days.

Database 20 stores the counts of news articles, and comparator 22 receives the counts of news articles. Comparator 22 then computes the value of the counts of news articles for the most recent seven days and the value of the counts of news articles for the seven days prior to the most recent day. These values are compared to one another to determine if the values are similar or have a relatively large difference.

This method may be used for a wide range of time periods, such as days, weeks and months, and including relatively short intervals, such as half-hour increments, so as to closely track when a change has occurred.

Additionally, incremental changes over a period of time may be used to forecast total volume for an entire period. This technique can be useful to identify significant changes in volume before the end of the period. For example, if there are two news stories about company X on average per day and we have observed 50 news stories by noon, it is clear that the current day will exhibit unusual volume even though there are 12 hours left in the day.

It is also possible to configure the system to report those subjects having the highest change in news article volume for a given time period. For example, the system might report, for a ticker alert, the top 40 companies having the highest change in news article volume over their typical levels of news volume.

When the counts are converted to frequencies, the weighted moving average method can be used by substituting the frequency value for the count value.

Another method to perform the weighted moving average is to convert the frequency values to logarithmic values. Comparison of the logarithmic values can be helpful to highlight the relative change in news counts for a given subject.

Tagging Mechanism

Still looking now at FIG. 1, a tagging mechanism 26 may be provided to analyze and code each news article. Tagging mechanism 26 adds a reference code to each relevant article so as to permit rapid searching of server 14 by query engine 16. This reference code can relate to the names of companies, related stock ticker symbols, names of people, and other topics of interest.

Furthermore, tagging system 26 may be configured to prevent system 10 from counting articles with multiple parts or "change" messages more than once. Tagging mechanism 26 prevents redundant counting by grouping these messages with corresponding electronic tags. Counter 18 recognizes the reference code relating to a single message with multiple parts or "changes" and counts it accordingly.

Figure 2:
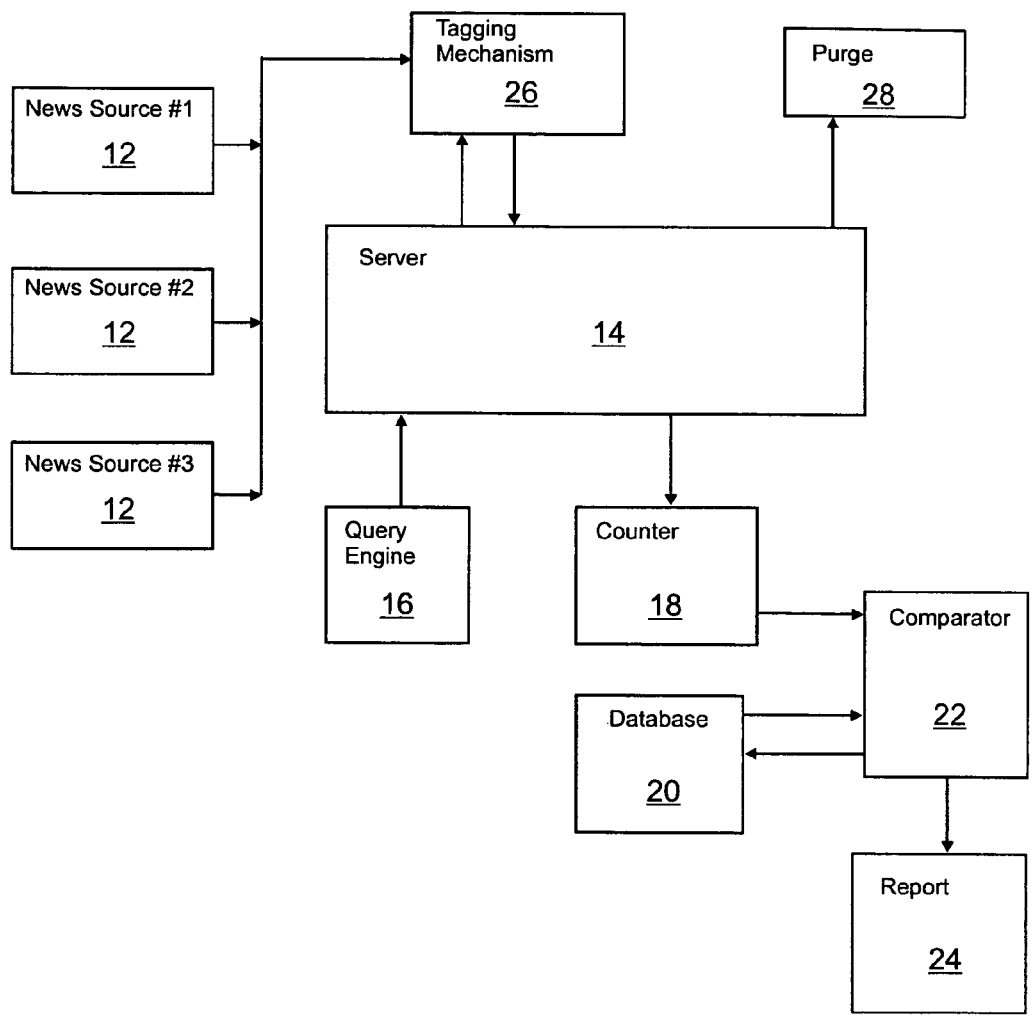
FIG. 2 is a schematic drawing of a representative embodiment of an alternative system of the present invention.

In another embodiment, and looking now at FIG. 2, tagging mechanism 26 may be located in series between news sources 12 and server 14. In such a construction, news articles are tagged before they are stored in the server 14 to permit subsequent querying and purging (see below).

Computer Server

In a preferred embodiment, computer server 14 has adequate memory to store news articles received from the various news sources for at least a given time period. News articles older than the given time period are automatically purged from the memory of the server, as represented by the reference numeral 28.

In another preferred embodiment, the computer server 14 has adequate memory to store news articles received from the various news sources 12 for at least a given time period. However, news articles are not automatically purged from the news server. The news articles may be manually purged or reside on the server until the memory is full.

In yet another preferred embodiment, the computer server 14 automatically purges all articles not tagged, as represented by reference numeral 28. Using this method, only subjects of interest are retained on server 14.

In still another preferred embodiment, only the electronic tag and date information is stored on the computer server 14; this technique conserves database memory and permits more rapid searching.

Historical Analysis

System 10 can also be configured to assemble historical statistics. Historical statistics are assembled by analyzing data acquired over long periods of time to determine past trends and changes in the volume of news articles for specific subjects. These historical statistics are constructed by comparator 22 from counts or frequencies stored in database 20 and may also be included in report 24.

Cyclical Or Seasonal Volume

System 10 is also configured so that, for a subject having counts of news articles displaying a periodicity with respect to a time period, seasonality is factored into the system. This is done by comparing the counts over similar periods. Comparator 22 analyzes the previous counts stored in database 20 for signs of seasonality. When seasonality is detected, the period of seasonality is determined and seasonally adjusted counts are stored in database 20. The period of seasonality is used to compare similar periods using the methods previously described.

In this disclosure, there are shown and described only the preferred embodiments of the invention, but as aforementioned, it is to be understood that the invention is capable of use in various other combinations and environments and is capable of changes or modifications within the scope of the inventive concept as expressed herein.

What is claimed is:

1. A method for determining changes in the count of news articles related to a subject over a recent time period, the method comprising:
   measuring a count of news articles for the subject produced by a present news source configuration over the recent time period;
   determining a reconfiguration factor to account for changes between the present news source configuration and a previous news source configuration, wherein determining the reconfiguration factor includes dividing the frequency of news articles for all subjects of a recent server configuration by the frequency of news articles for all subjects of a previous server configuration;
   applying the reconfiguration factor to a count of news articles for the subject for a previous time period to obtain a new count;
   comparing the count of news articles for the subject over the recent time period to the new count; and
   signaling when the comparison yields a difference greater than a predetermined amount.

2. The method of claim 1 further comprising storing in a database the count of news articles for the subject over the recent time period.

3. The method of claim 1 further comprising receiving news articles from at least one news source.

4. The method of claim 3 further comprising storing the news articles in a computer server.

5. The method of claim 1 wherein measuring the count of news articles further comprises querying the server.

6. The method of claim 5 wherein querying the server comprises the use of a preprogrammed query engine.

7. The method of claim 1 wherein the subjects comprise one or more from the group comprising company names, stock ticker symbols, people, products, and other topics of interest.

8. The method of claim 1 further comprising purging news articles stored in the computer server.

9. The method of claim 8 wherein the purging is conducted on the basis of the time period that the news articles were stored.

10. The method of claim 8 wherein purging is conducted on the basis of the subject matter of the news articles.

11. The method of claim 1 further comprising tagging the news articles by analyzing and coding the articles.

12. The method of claim 11 wherein the tagging is automated.

13. The method of claim 1 further comprising calculating a frequency of news articles for the subject over the recent time period from the count of news articles for the subject over the recent time period.

14. The method of claim 1 further comprising analyzing previous counts for a period of seasonality.

15. The method of claim 14, further comprising storing the period of seasonality.

16. The method of claim 14 further comprising comparing the counts and frequencies of the recent time period to the counts and frequencies of the previous time period using the period of seasonality.

17. The method of claim 1 further comprising calculating a weighted average of the count of news articles of the recent time period and of the count of news articles of the previous time period.

18. The method of claim 17 wherein calculating the weighted average of the given time period includes finding the logarithmic values of the frequency of news articles related to the subject for a selected time period including the recent time period and for a previous time period not including the recent time period, and comparing the logarithmic values.

19. The method of claim 17 further comprising calculating the logarithmic value of a first time period including both the recent time period and a portion of the previous time period, and calculating the logarithmic value of a second time period including both the portion of the previous time period of the first time period and a previous period of equal duration to the recent period, and comparing the logarithmic values of the first and second time periods as rolling averages.

20. The method of claim 17 further comprising calculating the logarithmic value of a first time period including both the recent time period and a portion of the immediately previous time period, and calculating the logarithmic value of a second time period including both the portion of the immediately previous time period and a portion of the previous period of unequal duration to the recent period, and comparing the logarithmic values of the first and second time periods.

21. The method of claim 2 further comprising assessing the counts and frequencies stored in the database to construct historical statistics.

22. The method of claim 2 further comprising assessing the counts and frequencies stored in the database to construct forecast scenarios.

23. The method of claim 1 further comprising determining changes in the count of news articles related to multiple subjects over a given time period.

24. The method of claim 1 further comprising determining changes in interest of multiple subjects over multiple time periods.

25. A system for determining changes in the count of news articles related to a subject over a recent time period, the system comprising:
- a counter for measuring a count of news articles for the subject produced by a present news source configuration over the recent time period;
- a comparator for determining a reconfiguration factor to account for changes between the present news source configuration and a previous news source configuration, wherein determining the reconfiguration factor further includes dividing the count of news articles for all subjects over the recent time period by the count of news articles for all subjects over at least one prior time period of equal duration;
- a processor for applying the reconfiguration factor to a count of news articles for the subject for a previous time period to obtain a new count;
- a comparator for comparing the count of news articles for the subject over the recent time period against the new count of news articles for the subject for a previous time period; and
- a report for signaling when the comparison yields a difference greater than predetermined amount.

* * * * *